May 2, 1950 D. B. SMITH 2,505,843

TELEVISION RECEIVER

Filed June 4, 1945 2 Sheets-Sheet 1

INVENTOR.
DAVID B. SMITH
BY HIS AGENT
Carl H. Synnestvedt

May 2, 1950 D. B. SMITH 2,505,843

TELEVISION RECEIVER

Filed June 4, 1945 2 Sheets-Sheet 2

INVENTOR.
DAVID B. SMITH
BY HIS AGENT
Carl H. Synnestvedt

Patented May 2, 1950 2,505,843

UNITED STATES PATENT OFFICE 2,505,843

TELEVISION RECEIVER

David B. Smith, Flourtown, Pa., assignor, by mesne assignments, to Philco Corporation, Philadelphia, Pa., a corporation of Pennsylvania Application June 4, 1945, Serial No. 597,471

5 Claims. (Cl. 178—5.8)

This invention relates to carrier wave receivers, and more particularly to an improved television receiver of the superheterodyne type in which the carrier frequency of the sound-modulated intermediate frequency signal is inherently fixed. In accordance with the invention the carrier frequency of this signal is rendered wholly independent of changes or variations in receiver tuning and of drift in the operating frequency of the receiver's local oscillator.

Conventional television receivers, as they are employed in practice and as described in the literature (see, for example, Fink, "Principles of Television Engineering," 1940, pp. 450–470) may comprise, inter alia, an antenna system, a tuned radio frequency stage, a frequency converter (first detector and local oscillator), and a pair of intermediate frequency channels. One of the intermediate frequency channels is utilized solely in the selection and amplification of the picture-modulated intermediate frequency signal, while the other is utilized solely in the selection and amplification of the sound-modulated intermediate frequency signal. The frequency converter stage, however, is common to both the picture-modulated and sound-modulated carrier signals. In general, the picture channel has a relatively wide pass-band adapted to pass the carrier and the desired sidebands of the converted picture-modulated carrier signal, while the sound channel has a relatively narrow pass-band adequate to pass the converted sound-modulated carrier signal. The frequency separation between these two intermediate frequency channels is fixed, and is equal to the frequency separation between the sound and picture channels as transmitted.

Ideally, when the two intermediate frequency channels are properly tuned, optimum picture reception obtains when the receiver is tuned to provide optimum sound reception. In practice, however, this is frequently not the case, even under ideal conditions. The result has been that the operator has had to choose between a receiver tuning adjustment which yields a good picture with poor sound quality, and one which provides good sound, but inferior picture quality. This difficulty is aggravated in the event of unequal detuning of the two intermediate frequency channels; such detuning is common and may result from tube replacements, aging of components, changes in humidity conditions, and the like.

Frequency drift of the local oscillator represents a further and even more serious problem which finds no solution in conventional television receiving systems. The oscillator drift problem, while it is serious now, promises to become even more serious when use is made of the ultra-high frequency television bands which are now contemplated. The serious nature of the problem of frequency drift has been widely recognized. For example, the Radio Technical Planning Board has found this problem to be so severe, even in the present television channels below 225 megacycles, that the television panel of this board now proposes that the maximum deviation of the frequency-modulated sound carrier be reduced from the present standard of 75 kilocycles to only 25 kilocycles in order to reduce the likelihood of the sound modulated carrier drifting out of the usual 250 kilocycle intermediate frequency pass-band provided for it in the conventional television receiver. Of course, local oscillator drift also affects picture quality, but not so deleteriously as it affects sound quality.

The magnitude and difficulty of the drift problem will be appreciated from the following. Well designed, stabilized, local oscillator circuits, of the type adapted for use in television receivers, may be expected to exhibit frequency drift, due to temperature variations alone, of somewhat more than 0.01%. At 200 megacycles this amounts to a frequency drift of over 20 kilocycles, while at 1000 megacycles the drift would exceed 100 kilocycles.

In conventional television receivers, particularly in receivers employing push button station selection where such frequency drift must be tolerated, it has been necessary to provide intermediate frequency amplifiers of considerable band width (and hence of relatively low gain per stage) in order to keep the sound modulated intermediate frequency within the amplifier's pass-band. For the same reason it has also been necessary to utilize a frequency detector or discriminator having a comparable band width and having, in consequence, a relatively low level output. Moreover, under these conditions, the center frequency of the frequency modulated carrier rarely coincides with the center of the detector's operating characteristic, and consequently full advantage cannot be taken of the inherent noise-reducing possibilities of the conventional balanced frequency detector.

The present invention avoids all of these difficulties through the utilization of a novel circuit arrangement which provides a sound-modulated intermediate frequency signal whose center frequency is inherently fixed and independent of the operating frequency of the local oscillator.

Accordingly, it is a primary object of the present invention to provide, in a television receiver of the superheterodyne type, a sound-modulated intermediate frequency signal whose center frequency is inherently fixed, regardless of the operating frequency of the local oscillator.

It is another object of the invention to minimize television receiver drift problems, particularly with respect to the sound channel.

These and other objects of the invention, and the manner in which they are attained, will appear from the following detailed description and the accompanying drawings, in which Fig. 1 is an explanatory diagram illustrating the relation between the picture and sound transmission channels in accordance with present television practice;

Figure 1:
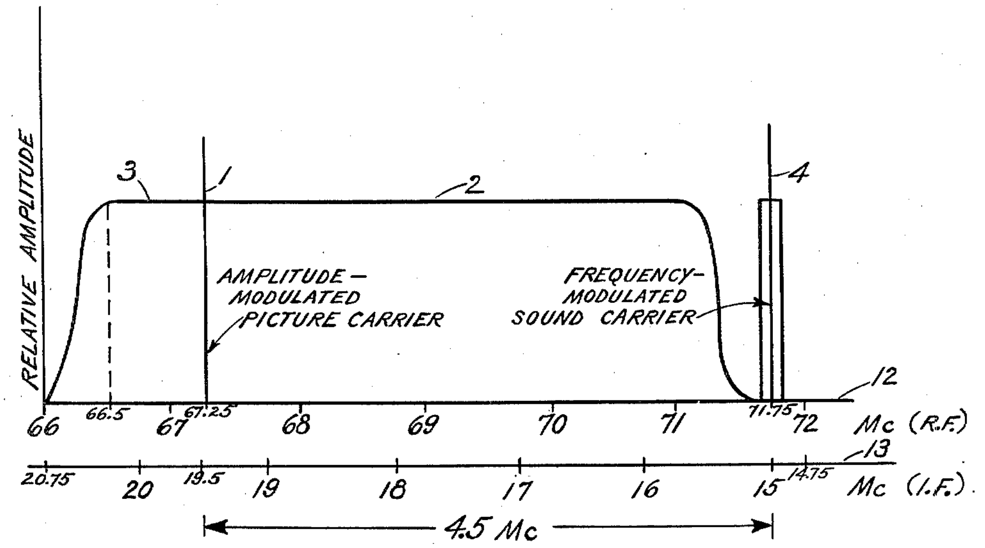

Reference may now be had to Fig. 1 which illustrates approximately the frequency and amplitude relations existing between the picture and sound transmission channels in the present 6-megacycle, standard television broadcast channel. As will appear hereinafter, the present invention, while not limited to any specific transmission standard, is adapted to receive television signals broadcast in accordance with the standard illustrated in Fig. 1. In the interests of simplicity and convenience, therefore, the invention will be described with specific reference to this standard.

The standard television broadcast channel illustrated in Fig. 1 includes, as is well known, an amplitude-modulated picture carrier 1 located 1.25 megacycles above the low-frequency limit of the channel, a complete upper sideband 2 extending from carrier frequency to approximately 5.5 megacycles from the low-frequency limit of the channel, a vestigial lower sideband 3 extending from carrier frequency to approximately the low-frequency limit of the channel, and a frequency-modulated sound carrier 4 located 5.75 megacycles above the said low frequency limit. Both upper and lower sidebands of the frequency-modulated sound carrier are present. The type of picture channel described requires what is known as "vestigial sideband" operation at the transmitter, as distinguished from "double sideband" operation in which both picture sidebands are transmitted.

The amplitude modulated picture carrier and the frequency modulated sound carrier are spaced by precisely 4.5 megacycles, and this spacing is accurately held, at the transmitter, to very close tolerances. Further reference will be had to this factor hereinafter.

Figure 2:
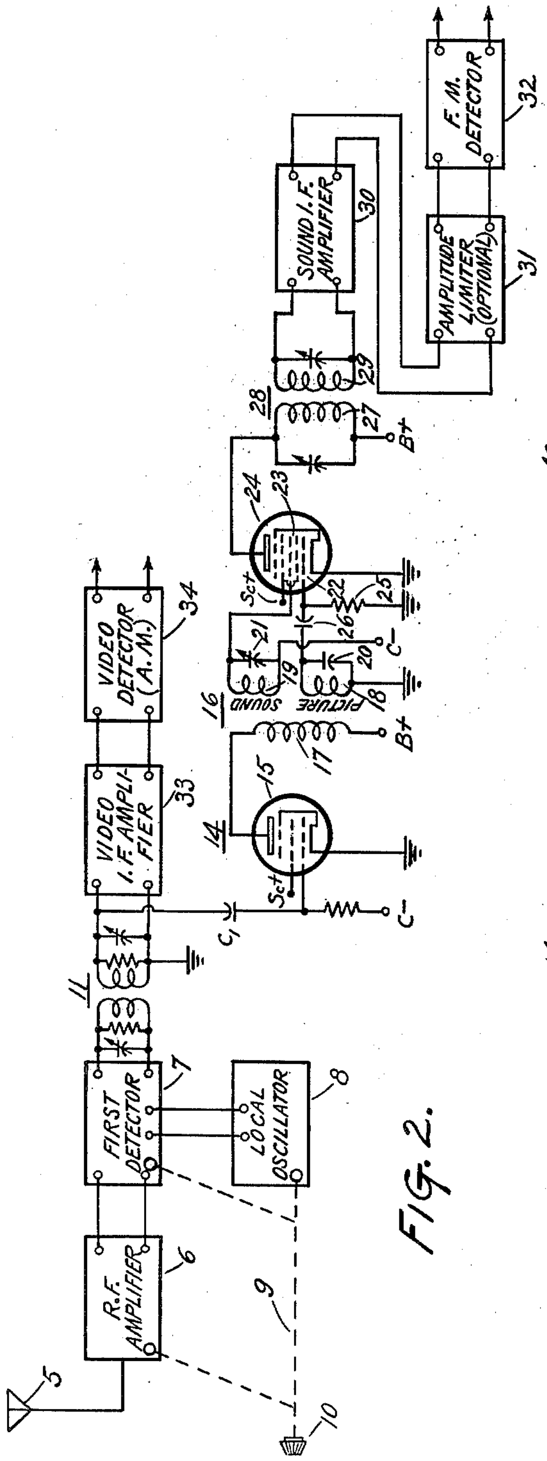
Fig. 2 is a diagrammatic illustration of a television receiver constructed in accordance with the principles of the present invention.

The television receiver illustrated in Fig. 2 is of the superheterodyne type and includes an antenna 5, a radio frequency amplifier 6, a first detector 7, and a local oscillator 8. The tuning means included in the amplifier 6, the first detector 7, and the local oscillator 8 are mechanically ganged by a suitable means 9 to enable tuning of the receiver by a single tuning control 10, or by a series of push buttons (not shown). The intermediate frequency signal generated in the first detector stage 7 is supplied to subsequent stages of the receiver by way of a suitable band-pass coupling arrangement, such as the damped, double-tuned transformer 11. The picture signal components present across the secondary winding of transformer 11 may be amplified in the intermediate frequency amplifier 33, detected in the amplitude modulation detector 34, amplified, and finally supplied to a suitable picture reconstituting device, such as a picture tube or the like (not shown).

The foregoing elements are all well known in the art, and consequently a detailed description of their operation is deemed unnecessary. Briefly, however, it may be said that the function of the first detector and local oscillator combination 7—8 is to convert the radio frequency signal supplied by the R. F. amplifier 6 to an intermediate frequency signal occupying a predetermined intermediate frequency band or channel. Thus, for example, and with reference to Fig. 1, the converter device 7—8, when supplied with a complete television signal occupying the radio frequency channel extending from 66 to 72 megacycles (scale 12), converts the said signal to an intermediate frequency signal occupying the intermediate frequency channel extending from 14.75 to 20.75 megacycles (scale 13). This specific conversion is obtained by operating the local oscillator 8 at a frequency of 86.75 megacycles, i. e. 19.5 megacycles above picture carrier frequency. It is to be noted that while the frequency conversion operation herein described has effected a substantial shift (together with frequency inversion) in the television signal of Fig. 1, the frequency dimensions of the signal are preserved throughout. In the tuning of the receiver, the effect of small tuning adjustments is, of course, to shift the complete signal of Fig. 1 slightly to the right or left relative to the intermediate frequency scale 13. In like manner the effect of frequency drift of the local oscillator 8 is similarly to shift the said signal relative to the scale 11. In every case, however, the frequency dimensions of the original R. F. signal are accurately preserved.

The present invention takes advantage of this inherent preservation of frequency dimension, and utilizes this effect in the generation of a sound-modulated intermediate frequency carrier signal of fixed carrier frequency. To this end the procedure employed in the realization of the objectives of the present invention comprises mixing, i. e. heterodyning, the amplitude-modulated picture carrier with the frequency-modulated sound carrier in a non-linear electrical circuit, deriving from said circuit a frequency-modulated intermediate frequency sound carrier having incidental amplitude modulation representing picture signal components but having a precisely fixed carrier frequency, and detecting said intermediate frequency sound carrier in a system which is responsive to frequency modulation of said intermediate frequency sound carrier, but substantially non-responsive to amplitude modulation of said carrier.

The method utilized and the means employed in the realization of the features and objects of the present invention will now be set forth in connection with the further description of the embodiment of Fig. 2. The frequency-converted picture and sound signal voltage present across the output terminals of the converter output transformer 11 is applied, by way of a coupling condenser C, to a buffer amplifier stage 14 comprising a pentode 15 having a transformer 16 connected in its anode or output circuit. The transformer 16 has an untuned primary winding 17 and a pair of tuned secondary windings 18 and 19. Winding 18 is tuned to the frequency of the picture carrier present in the output of the buffer amplifier 14 (in this example 19.5 megacycles), while the winding 19 is tuned to the frequency of the sound carrier present in the output of said amplifier (in this example 15 megacycles).

The resonant circuit comprising the winding 18 and the adjustable condenser 20 should have a pass-band sufficiently broad to accept the picture carrier regardless of such normal variations or changes in carrier frequency as may be effected through mistuning, oscillator drift, or the like. A pass-band of the order of 200 kilocycles has been found satisfactory.

The resonant circuit comprising the winding 19 and the adjustable condenser 21 should have a pass-band sufficiently broad to accept the frequency-modulated sound carrier and its significant sidebands regardless of mistuning, oscillator drift, or the like. Where the sound transmission system employs a maximum carrier deviation of 75 kilocycles, a pass-band of the order of 200 kilocycles is usually satisfactory.

The signal voltages available across the resonant circuits 18, 20 and 19, 21 are applied to the input grids 22 and 23 of a frequency converter tube 24 which is conveniently of the pentagrid converter type. Preferably, as illustrated, the picture carrier is applied to the No. 1 grid of the converter tube (grid 22) while the frequency-modulated sound carrier is applied to the No. 3 grid thereof (grid 23). Preferably also the picture signal grid 22 has a relatively sharp cut-off characteristic, and may conveniently be biased by means of a grid-leak, grid-condenser arrangement 25, 26. Through the use of such an arrangement a partial limiting effect may be obtained in that the amplitude of the beat frequency signal generated in the converter tube 24 is rendered relatively independent of the amplitude of the picture carrier applied to grid 22. The bias voltage C— applied to grid 23 may be fixed, and is preferably of a magnitude such as to provide optimum conversion conductance.

The beat, or intermediate, frequency signal generated in the converter tube is developed across the primary winding 27 of double tuned transformer 28, and is applied, by way of secondary winding 29, to a conventional intermediate frequency amplifier 30. This intermediate frequency signal is frequency modulated in accordance with the desired sound signal and may have incidental amplitude modulation representing picture signal components. The magnitude of the amplitude modulation component will depend, of course, upon the amount of amplitude limitation employed in the system. The newly generated, frequency modulated, intermediate frequency signal will, however, have a precisely fixed, invariable carrier frequency which is equal to the frequency difference between the amplitude-modulated picture carrier 1 and the frequency-modulated sound carrier 4. In the present example, this difference is 4.5 megacycles (see Fig. 1), and as has already been explained depends not at all upon tuning or circuit tracking, but only upon the difference between the picture and sound carrier frequencies as transmitted. Since this frequency difference is maintained to a high degree of precision at the transmitter, it will be apparent that the present invention provides an intermediate frequency stabilitity and precision which would otherwise be almost impossible of attainment.

The amplified intermediate frequency signal supplied by the amplifier 30 may now be passed through a conventional amplitude limiter 31 adapted to remove amplitude modulation therefrom. The limited signal may then be applied to a suitable frequency modulation detector 32 for detection. If the amplitude limitation of the intermediate frequency signal is adequate the detector 32 may be conventional in design. However, if the amplitude limitation of the signal is inadequate, or if it is desired to omit the limiter 31 completely, a frequency detector 32 which is insensible to amplitude modulation may be utilized. A preferred form of such a detector is the subject of United States Patent No. 2,494,795 which issued to William E. Bradley on January 17, 1950.

Figure 3:
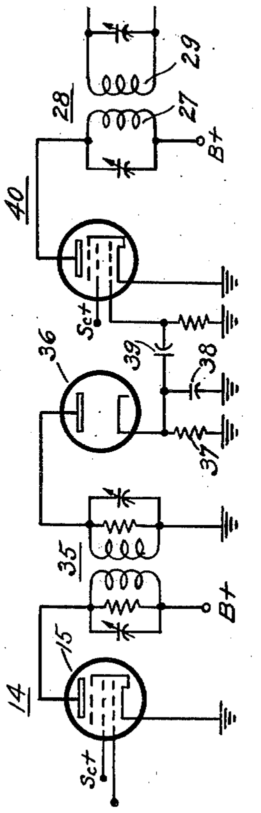
Fig. 3 is an alternative embodiment of a portion of the receiver illustrated in Fig. 2.

An alternative arrangement of certain of the circuits of Fig. 2 is illustrated in Fig. 3. The purpose of the latter illustration is to demonstrate that it is not necessary to separate the sound and picture carriers prior to mixing as was done in the system of Fig. 2. The circuit diagram illustrated in Fig. 3 may be regarded as an alternative embodiment of that portion of Fig. 2 which comprises the elements 14 through 29 inclusive. The inclusion in Fig. 3 of terminal elements (14, 15, 27, 28 and 29) common to both figures serves to indicate in what manner the circuit of Fig. 3 may be substituted for the corresponding elements in Fig. 2.

In the circuit of Fig. 3, the complete picture and sound signal voltage present in the output of the buffer amplifier stage 14 is supplied, by way of transformer 35, to a rectifier circuit comprising a diode 36 and diode load circuit 37, 38. It will be apparent that the transformer 35, in this embodiment, serves as a source of both the frequency-modulated sound carrier signal and the amplitude-modulated picture carrier signal, so far as the rectifier circuit is concerned. The rectified signal established across the diode load includes, inter alia, a beat, or intermediate, frequency signal resulting from the mixing, or heterodyning, of the sound and picture signal carrier waves present in the output of the buffer amplifier 14. As in the previous example this intermediate frequency signal has an inherently fixed carrier frequency which is independent of receiver tuning or circuit tracking. The signal voltage present across the diode load impedance 37, 38 is applied, by way of coupling condenser 39, to the grid circuit of a selective buffer amplifier 40. The desired intermediate frequency signal, frequency modulated in accordance with the television sound signal, is selected to the exclusion of the undesired products of rectification by means of the tuned transformer 28, from which point it may be applied to the intermediate frequency amplifier 30 as illustrated in Fig. 2.

Figure 4:
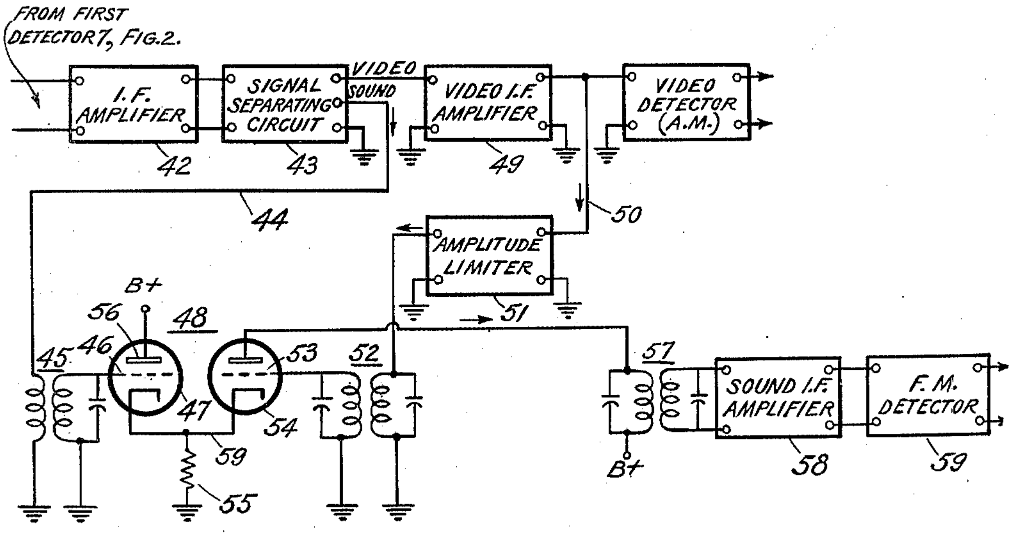
Fig. 4 is a diagrammatic illustration of a preferred embodiment of the invention.

Reference may now be had to the schematic diagram of Fig. 4, which illustrates a preferred embodiment of the invention. Since the radio frequency circuits of this embodiment may comprise, without modification, the elements designated 5 through 10 inclusive of Fig. 2, it is deemed unnecessary to reproduce such circuits in Fig. 4. It will be apparent, however, that the frequency-converted picture and sound signal voltages present in the output of the first detector 7 (Fig. 2) are applied in any convenient manner to the intermediate frequency amplifier 42. This amplifier is conventional in design and is adapted to transmit both the picture-modulated and the sound-modulated intermediate frequency signals. As in the previous examples it will be assumed that the picture-modulated and sound-modulated carriers are amplitude and frequency modulated respectively. The picture-modulated and sound-modulated carrier waves are now separated in a suitable signal separating circuit 43. This circuit may be conventional in both function and design, but by way of specific example the device 43 may be constructed in accordance with the principles disclosed in the William E. Bradley Patent No. 2,312,145, issued February 23, 1943.

Proceeding from the signal separating circuit 43, the separated sound-modulated carrier signal is applied, by way of conductor 44 and coupling transformer 45, to the control grid 46 of triode 47 which comprises a part of the mixer or converter stage 48. The separated picture-modulated carrier signal, on the other hand, is further amplified in the intermediate frequency amplifier 49, applied, by way of conductor 50, to the signal amplitude limiter 51, and thence applied, by way of coupling transformer 52, to the control grid 53 of the triode 54 which comprises a further part of the previously mentioned mixer or converter stage 48. The operating level of the amplitude limiter 51 preferably, though not necessarily, is adjusted to limit the picture-modulated carrier to substantially its "white" or unmodulated carrier level, so that the signal applied to control grid 53 is of a fixed, unvarying amplitude, or nearly so.

The converter stage 48, in this particular embodiment, comprises a pair of triodes 47 and 54 provided with a common cathode load resistor 55. The anode 56 of triode 47 is connected directly to a source of positive potential, B+. The anode circuit of triode 54, however, constitutes the output circuit of converter 48 and includes a coupling transformer 57 by means of which the inherently fixed, sound-modulated intermediate frequency signal, generated in the converter stage 48, is applied to the intermediate frequency amplifier 58. Since converter circuits of the above-described character are well known in the art, it will suffice to say that, in the operation thereof, the sound and picture carriers are heterodyned in the triode 54, the sound-modulated carrier being applied thereto by way of the common cathode connection 59, while the picture carrier is applied directly to the control grid 53 thereof.

If desired the intermediate frequency amplifier 58 may, in accordance with common practice, include a conventional amplitude limiting stage adapted to remove amplitude variations in the frequency-modulated sound signal before it is applied to the frequency modulation detector 59. Practice has shown, however, that such amplitude limiting means may be omitted, if a detector 59 is employed which is insensible to amplitude modulation, such as that described in the above-mentioned co-pending application of William E. Bradley.

Prior to the actual embodiment of the present invention in a complete television receiver, a theoretical investigation was made to determine whether, in vestigial sideband television systems, audible distortion would be introduced by the spurious frequency modulation of the converted sound-modulated intermediate frequency signal resulting from unbalanced sideband conditions of the amplitude-modulated picture carrier. As is well known in the art, receivers adapted for use with vestigial sideband systems are provided with intermediate frequency amplifiers adapted to effect non-symmetrical transmission, about the carrier frequency, of the picture-modulated carrier signal (see, for example, Fink, "Principles of Television Engineering," 1940, pp. 265–267). One of the results of such unsymmetrical amplification or attenuation is, in effect, to frequency modulate, at video frequency, the otherwise fixed picture signal carrier. It was evident that this spurious frequency modulation would be transferred, in the process of frequency conversion, to the sound-modulated intermediate frequency carrier. It was found, however, that the frequency modulation thus introduced was negligible in comparison to the frequency deviations employed in wide-band frequency modulation transmission, and that in consequence the spurious audio frequencies thus introduced were at least 60 decibels below the level of the desired audio frequency signals transmitted at the maximum rated frequency deviation. Since this is considerably better than is needed in practice, it was concluded, and experimentally verified, that no special precautions were necessary to prevent the occurrence of the above-mentioned spurious frequency modulation effects.

If, however, it is desired to reduce or to eliminate these spurious frequency modulation effects entirely, this may be done by deriving the picture-modulated carrier (i. e. the carrier which is to be heterodyned with the sound-modulated carrier) at a point in the intermediate frequency channel which is ahead of the point at which dissymmetry is introduced. An example of such an arrangement is illustrated in Fig. 2 in which the picture-modulated carrier (together with the sound-modulated carrier) is derived from a point between the first detector 7 and the intermediate frequency amplifier 33. Alternatively, if the picture-modulated carrier is derived at a later point in the system, subsequent to the introduction of sideband dissymmetry about the picture carrier, symmetry may be restored, partially or completely, through the agency of a suitable filter network (incorporated in the path 50 between the amplifier 49 and the limiter network 51, Fig. 4) whose frequency response characteristic is such as to restore the original sideband symmetry. In this connection it may be noted that the present standards for vestigial sideband systems provide for the unattenuated transmission of both upper and lower sidebands up to 0.75 megacycles either side of carrier frequency (see Fig. 1). Since dissymmetry beyond these limits could result only in the introduction of superaudible frequencies, this dissymmetry may be ignored completely.

Although my invention has been described with particular reference to the several embodiments illustrated, it will be apparent to those skilled in the art that the invention is capable of other forms of physical expression, and is therefore not to be limited to the present disclosure, but only by the scope of the appended claims.

I claim:

1. A television receiver adapted for the simultaneous reception of an amplitude-modulated picture-signal carrier wave having a predetermined carrier frequency and a frequency-modulated sound-signal carrier wave having a carrier frequency which differs from said first-named carrier frequency by a predetermined fixed frequency difference, said television receiver comprising elements including: a first source of signal voltage amplitude-modulated in accordance with the amplitude modulation on said first-mentioned carrier wave, means for detecting said amplitude-modulated signal voltage, a second and independent source of signal voltage frequency-modulated in accordance with the frequency modulation on said second-mentioned carrier wave, the carrier frequencies of said signal voltages differing by said predetermined fixed frequency difference, a signal amplitude limiting circuit responsive to the amplitude-modulated signal voltage from said first source and arranged to remove at least a substantial portion of the amplitude variations therefrom, means independent of said detecting means for heterodyning the signal voltage from said second source with the amplitude-limited signal voltage derived from said amplitude limiting circuit to develop a difference-frequency carrier signal whose carrier frequency is equal to said frequency difference, means for selecting the said difference-frequency signal from said heterodyning means, and a frequency detector responsive to frequency modulation of said difference-frequency signal.

2. A television receiver as claimed in claim 1, characterized in that said signal amplitude limiting circuit is constructed and arranged to limit the amplitude-modulated signal from said first source to a level below which said signal is not amplitude modulated.

3. A television receiver of the superheterodyne type, comprising elements including a frequency converter stage responsive simultaneously to both picture-modulated and sound-modulated signals, said frequency converter stage being constructed and arranged to develop, in response to a complete television signal, both an amplitude-modulated picture-signal carrier wave and a frequency-modulated sound-signal carrier wave, said carrier waves differing in carrier frequency by a predetermined fixed frequency which is independent of receiver circuit constants, signal separating means for electrically separating said frequency-modulated carrier wave from said amplitude-modulated carrier wave, means for detecting said amplitude-modulated carrier wave, non-linear electronic circuit means independent of said detecting means and responsive to said separated waves for generating a difference-frequency wave whose carrier frequency is equal to said predetermined fixed frequency, and a frequency detector for generating an audio frequency signal in response to the frequency modulation of said difference-frequency wave.

4. A television receiver of the superheterodyne type, comprising elements including a frequency converter stage responsive simultaneously to both picture-modulated and sound-modulated signals, said frequency converter stage being constructed and arranged to develop, in response to a complete television signal, both an amplitude-modulated picture-signal carrier wave and a frequency-modulated sound-signal carrier wave, said carrier waves differing in carrier frequency by a predetermined fixed frequency which is independent of receiver circuit constants, common means for amplifying said modulated carrier waves, a signal separating means for electrically separating said frequency-modulated carrier wave from said amplitude-modulated carrier wave, means for further amplifying said amplitude-modulated carrier wave, means for detecting said amplitude-modulated carrier wave, signal heterodyning means independent of said detecting means for mixing said further amplified carrier wave with said separated frequency-modulated carrier wave to develop a difference-frequency carrier signal whose carrier frequency is equal to said predetermined fixed frequency, means for deriving the said difference-frequency wave from said heterodyning means, and means responsive to the frequency modulation of said difference-frequency wave for deriving a modulation signal therefrom.

5. A television receiver of the superheterodyne type, as claimed in claim 4, characterized in the provision of a signal amplitude limiter in the path between said further amplifying means and said signal heterodyning means.

DAVID B. SMITH.

REFERENCES CITED

The following references are of record in the file of this patent:

UNITED STATES PATENTS

| Number | Name | Date |
|---|---|---|
| 1,495,470 | Farrington | May 27, 1924 |
| 1,681,564 | Wright | Aug. 21, 1928 |
| 1,690,719 | Chaffee et al. | Nov. 6, 1928 |
| 1,735,134 | Schroter | Nov. 12, 1929 |
| 1,797,317 | Brand | Mar. 24, 1931 |
| 2,056,607 | Holmes | Oct. 6, 1936 |
| 2,118,610 | Koch | May 24, 1938 |
| 2,164,745 | Kentner | July 4, 1939 |
| 2,227,822 | Campbell | Jan. 7, 1941 |
| 2,332,540 | Travis | Oct. 26, 1943 |
| 2,350,902 | Kallmann | June 6, 1944 |
| 2,403,957 | Seeley | July 16, 1946 |
| 2,448,908 | Parker | Sept. 7, 1948 |